June 24, 1941.   E. M. SALIBA ET AL   2,246,761
PORTABLE CUTTING TOOL
Filed March 31, 1938   4 Sheets-Sheet 3
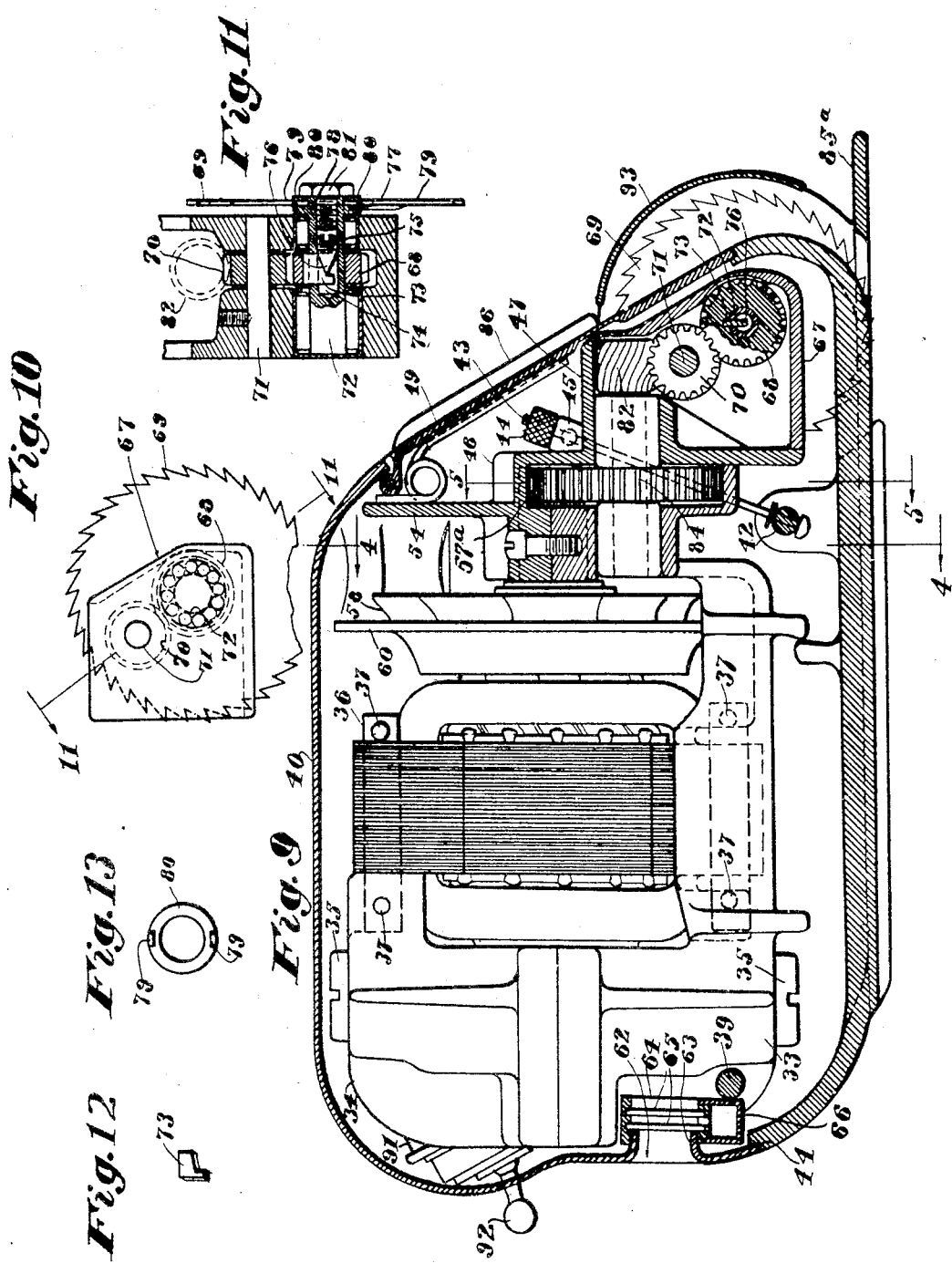
Inventors
Edward M. Saliba
Merton C. Vincent
By James C. Hamilton
Attorney June 24, 1941.  E. M. SALIBA ET AL  2,246,761
PORTABLE CUTTING TOOL
Filed March 31, 1938  4 Sheets-Sheet 4
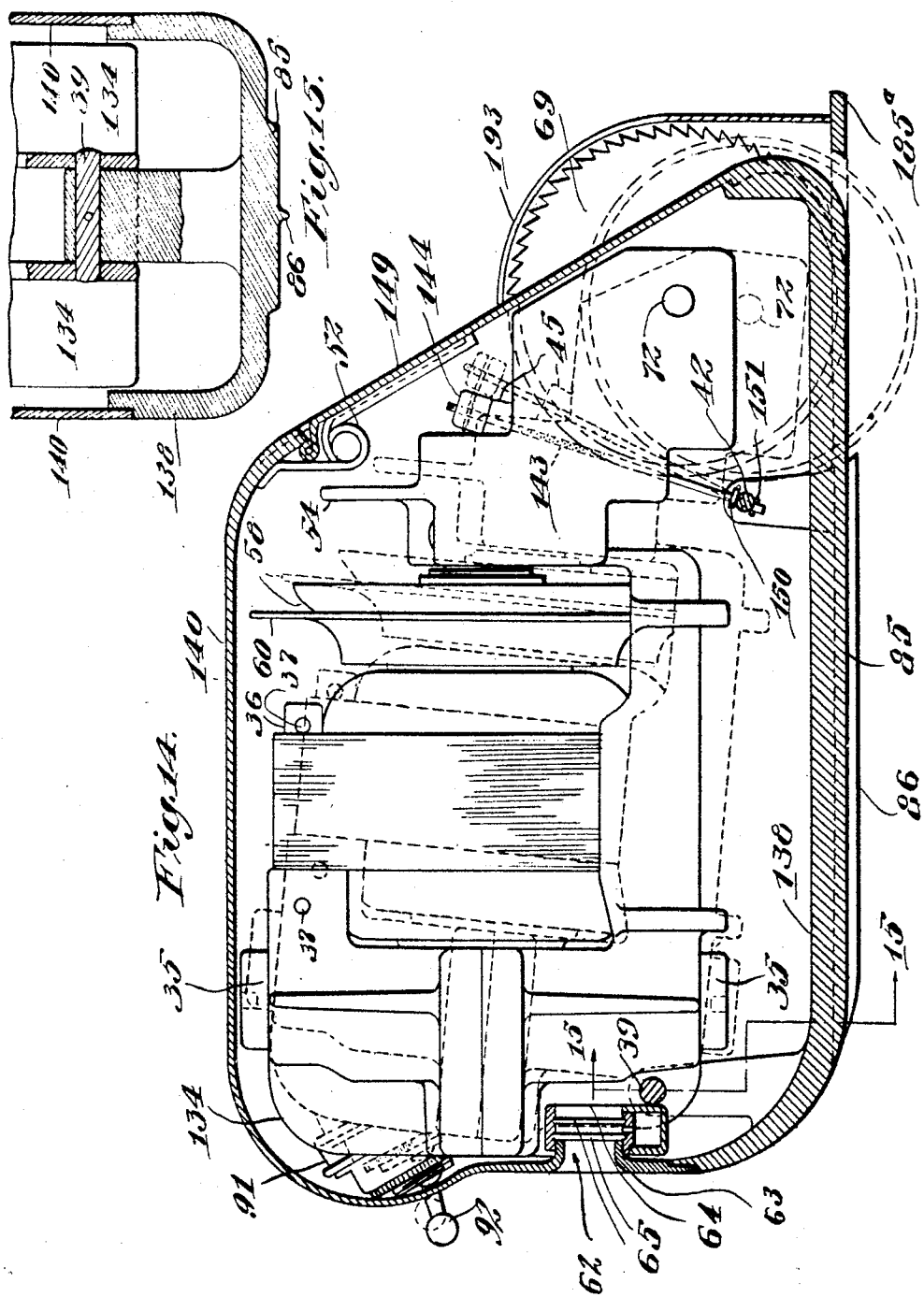
Inventors
Edward M. Saliba
Merton C. Vincent
By James C. Hamilton
Attorney Patented June 24, 1941

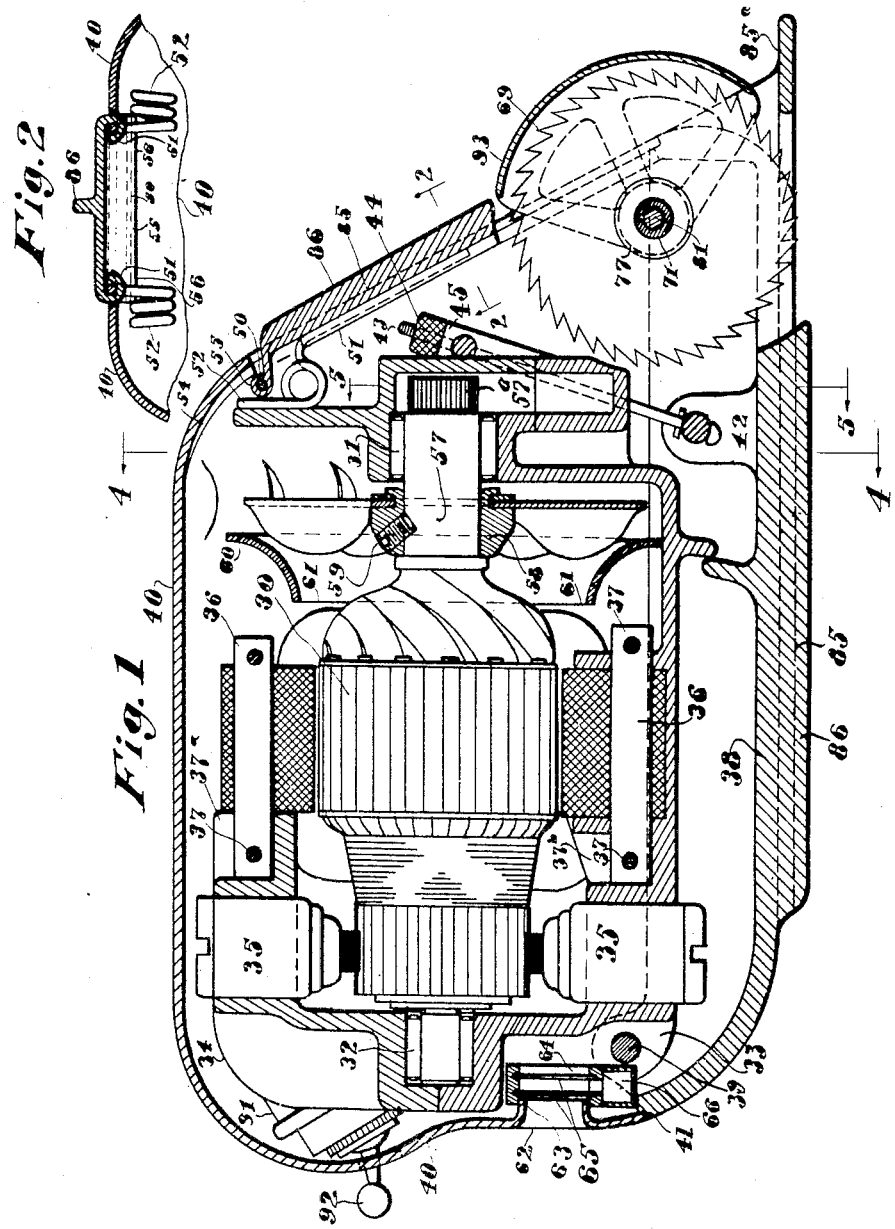

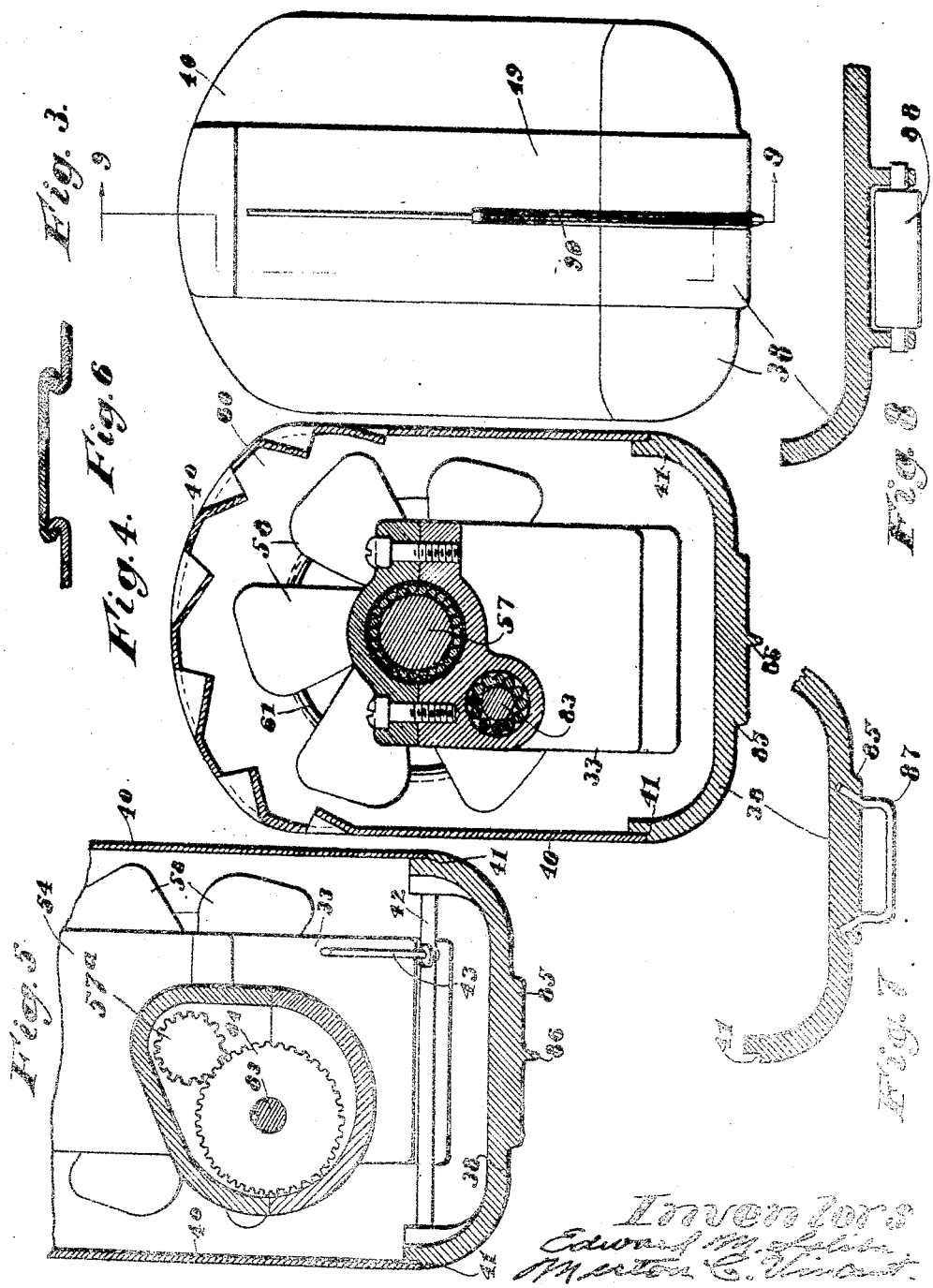

2,246,761

UNITED STATES PATENT OFFICE 2,246,761

PORTABLE CUTTING TOOL

Edward M. Saliba, Lawrence, and Merton C. Vincent, Lynn, Mass.

Application March 31, 1938, Serial No. 199,206

6 Claims. (Cl. 90—12)

Our present invention relates to cutting tools, and more particularly to portable cutting tools in which a small circular cutter is utilized for a cutting agent, the power being applied by means of an electrical motor which is built into the apparatus. The present application is a continuation in part of our earlier application filed June 7, 1937, Serial Number 146,754 for Portable cutting tool.

Our improved cutting tool is adapted to many uses. It may be used in the removal of old putty from window sash; for cutting sheet metal, plyboard, wallboard, linoleum, etc. In fact, the tool may be used to cut practically any sheet material having a thickness within the capacity of the effective cutting range of the circular cutter with which it is equipped.

The uses to which our cutting tool may be applied are so numerous and involve so many branches of industry that it is practically impossible to enumerate all of them, as most every workman or craftsman has his own particular uses whether it be in wood, metal, plastics or numerous other fields of endeavor.

Our tool is small and compact and may easily be held and operated in one hand. The cutter projects from the lower front end and is journalled within the apparatus so that when the tool is operated on one face the cutter will cut deeper than will be possible when the tool is turned and operated on the other face. The two operating faces of the tool are located at acute angles to each other. Numerous other features incorporated in our tool will be disclosed further along in the present specification.

The principal object of our invention is an improved portable cutting tool;

Another object is an improved portable cutting tool presenting working surfaces which are located at an acute angle to each other;

Another object is a tool of the character above described in which the cutter blade is projected from the operating end and journalled nearer to one working face than the other thereby making it possible to obtain two different depth cuts quickly by simply reversing the position of the instrument;

Still another object is a means for inserting guages in the casing for the purpose of varying the depth of the cuts. This is of particular advantage when the tool is used for routing and the like;

Still another object is an improved portable cutting tool electrically driven from an inclosed electrical motor and comprising certain ventilating apparatus in combination comprising a fan, air shield and filter, and Other objects and novel features comprising the construction and operation of our invention will be apparent as the description of the same progresses.

In the drawings illustrating the apparatus:

Fig. 1 is a central cross-section, portions of the electrical motor being shown in elevation;

Fig. 2 is a fragmentary cross-section taken on the line 2—2 of Fig. 1, and particularly showing the hinged front cover plate;

Fig. 3 is a front end elevation;

Fig. 4 is a cross-section taken on the line 4—4 of Fig. 1;

Fig. 5 is a fragmentary cross-section taken on the line 5—5 of Fig. 1, the upper portion being broken away;

Fig. 6 is a modification of the cover plate indicated at Fig. 2, the cross-section being broken away at either side;

Fig. 7 is a fragmentary cross-section of the base showing the method of mounting the cutting guages;

Fig. 8 is another fragmentary cross-section showing a base or working face provided with rollers;

Fig. 9 is a cross-section taken on the line 9—9 of Fig. 3, a portion of the apparatus being shown in elevation. The drive of the cutter member is shown in cross-section from the front of the machine through the driven gear which directly connects with the armature pinion shown in Fig. 1;

Fig. 10 is a side elevation of the cutter unit removed from the machine;

Fig. 11 is a cross-section taken on the line 11—11 of Fig. 10 particularly showing the method of locking the spiral gear which is directly connected with the cutter arbor;

Fig. 12 is a perspective view of the key which locks the cutter arbor gear shown in Fig. 11;

Fig. 13 is a side elevation of the cutter locking washer;

Fig. 14 is a partial cross-section and elevation of a slightly modified form showing the method of tilting the chassis within the casing to vary the cutting depth, and Fig. 15 is a cross-section taken on the line 15—15 of Fig. 14.

Referring more in detail to the drawings, Figs. 1 to 13 inclusive show the tool when constructed with two cutting faces. Figs. 14 and 15 show the tool when adapted to the use of a pivoted chassis within the casing varying the depth of the cutter by means of the adjustment of the chassis in the casing. 30 indicates the armature assembly of the motor which is supported in the front end bearings 31, and at the rear in roller bearings 32. These bearings are mounted in a chassis, the bottom section 33 being bolted to the rear upper portion 34, the two portions of which are split on the center line of the rear bearings 32. Electrical brush units 35, 35 are oppositely opposed in the upper and lower chassis portions 33 and 34, as shown in Fig. 1. Rods 36 are mounted through the laminations of the motor and pinned at 37 in recesses 37a and 37b located in the upper and lower chassis portions respectively. The front end of the lower chassis portion 33 forms the lower portion of the front motor bearing supporting the bearing 31. The chassis portion 33 is pivotally pinned to base 38 at 39. The upper case 40 fits over a rabbet 41 formed around the four sides of the base 38, and can be held or pressed on by any well-known means that permits its removal. In order to make said chassis 33 movable relative to said casing 40 so that the distance the saw 69 projects beyond said casing 40 may be varied to meet the needs of the work to be done, we provide a screw-threaded rod 43 to which a nut 44 is fixedly attached at the upper end to provide a knob for manually rotating said rod 43. The lower end of said rod 43 is free to turn in a pivoted bar 42 and is securely held against axial movement as shown in Figure 9 of the drawings. A boss 45 is part of the chassis assembly, and is threaded to receive the threaded rod 43. The pivoted bar 42 is so secured in the lower case 38 that said rod 43 will always be free to rotate. In the position shown in Figure 9 of the drawings the chassis assembly is at its highest location with respect to the lower case 38 and the cutter 69 projects its minimum distance below the working surface of said lower case 38. To adjust said cutter to any desired depth obtainable, the threaded rod 43 is rotated by turning said nut 44. This action causes the chassis assembly to move along rod 43 at threaded boss 45 and radially around pivot pin 39. It is obvious that this action results in definite changes in the amount of projection of said cutter 69 below said working surface. The cover plate 49 is hinged to the upper case 40 by means of the hinge pin 50, the side edges being rolled at 51 for the purpose of enclosing the springs 52, the other legs of which bear against the upper front bearing wall 53. The center hinge portion 55 is preferably formed on the cover plate 49, the end hinge members 56 being attached to the upper case 40. The cover plate normally remains in a closed position, as shown in the drawings, due to the spring members 52, but may be easily and quickly raised at will to provide access to the front interior.

Attached to the armature shaft 57 between the front end of the armature and the front bearing is an air circulating fan 58 the hub of which is fixed to the shaft 57 by means of the set screw 59. Between the fan 58 and the armature of the motor we have placed a baffle member 60 the central portion of which is open at 61, the opening of which surrounds the entire armature. The baffle plate 60 preferably separates the motor and rear mechanism from the front of the machine so that when it is in operation all air is drawn through the baffle plate opening 61, thereby reducing the motor temperature to a minimum. On the rear portion of the case 40 we have provided an air inlet opening in the nature of an inwardly drawn boss 63 over the end of which is fitted a removable dust trap and air strainer 64. When the motor is in operation, air is drawn in through the opening 62 and passes through air filter discs 65 located in the member 64. Such dust particles as may pass through the first strainer disc 65 are allowed to collect in the compartment 66 in the bottom of the unit. At intervals, the entire unit is removed and cleaned or a fresh unit substituted for the old.

On the front drive end of the machine we have provided a separate housing unit 67 which is shown in cross-section in Fig. 10. The front, side, and bottom of the unit are closed, as shown in Figs. 9 and 10. Within this unit is mounted the pinion 68 which drives the cutter 69, and the idler gear 70. The idler gear 70 rotates freely on the shaft 71 which is fixed in the unit 67.

The drive gear 68 is keyed to the cutter arbor 72 by means of a sliding key 73 which slides through a slot provided in the arbor 72 and which communicates with an internal recess 74 provided in the interior of the arbor. By an inspection of Fig. 12 which shows a perspective view of the key 73, it will be noted that the bottom edge of the key is cut off at an angle. In Fig. 11 it will be noted that we have threaded the recess 74 adjacent the cutter end and have inserted a special set screw 75 the end of which is provided with a taper point 76. When the point 76 of the set screw 75 engages the bottom edge of the key 73 the top edge of the key is pushed up through the slot in the arbor 72 and engaged in the key-way of the gear 68 securely locking the gear in place. On the cutter end of the arbor 72 we have provided a collar 77 against which the cutter 69 bears. On the outer portion of the collar 77 we provide a shoulder 78 over which the cutter 69 engages and adjacent the central opening in the cutter we have provided small openings oppositely disposed to each other through which lugs 79 located on the washer 80 pass. A machine screw 81 is threaded into the arbor and at the same time prevents the set-screw 75 from becoming loose but holding the cutter securely.

The idler gear 70 engages with a pinion 82 which is formed on the end of the shaft 83 journalled in the chassis 33. The shaft 83 also carries the intermediate gear 84 which is keyed thereto and is directly driven from the pinion 57a located on the end of the armature shaft 57.

On the front central portion of the case 40 and cover plate 49, as well as on the casing base 38, we have provided a raised track or guide face 85 the central portion of which is provided with a fin 86. The fin 86 which is located on the front side is limited to the cover portion, as shown in Fig. 1.

In place of the fin 86 we may also provide slots in the track or guide face 85 which are pitched at an angle toward each other in which we insert guage members 87. The guage members may vary in depth so that the operator is enabled to vary the depth of the cut. The fin 87 follows in the cut track produced by the cutter and acts as a guide maintaining the tool in a straight line. The guage member 87 may, if desired, have a central fin attached thereto. The guage member 87 is particularly desirable when cutting sheet material, etc.

At Fig. 8 we have shown rollers 88 attached to the base 38 which are very desirable in large machines too heavy to handle easily in one hand.

The lower front edge of the casing with particular respect to the front cover 49 and the base 38 is split at 90 to receive the cutter 69. This opening may vary in width depending on the type of work for which the machine is designed. Where tandem cutters are used the opening will be wider. The same will be true where certain types of grinding wheels are used in place of a cutter there being places where the machine may be used for grinding work.

In the rear end of the machine we have attached an electrical switch 91 to the upper chassis 34, the toggle lever 92 of the said switch projecting through an opening in the upper case 40.

Around the front cutting end of the machine and the cutter blade 69 we have provided a cutter guard 93 which is pivoted to the sides of the case 40 and may be rotated to either side or face of the machine as the case may be.

It will be further noted that the axis of the cutter blade is positioned closer to one operating side than the other to the effect that when the machine is used on one side, for instance, the side on which the cover plate occupies, the cutter will cut deeper than when the machine is used on the other side. This makes it possible to obtain a shallow and a deep cut interchangeably without altering other adjustments.

In Figs. 1 and 9, on the front end of the casing base 38, we have shown a guard plate or front guide face 85a, the bottom surface of which is in the same plane as the said casing base track or guide face 85. The purpose of this guard member is to prevent the tool from having a tendency to pivot upwardly on the cutter center when in operation. This tendency is due to the leverage action present between the cutter teeth and the cutter center when the teeth are engaged in cutting material. The guard 85a is made and attached in any simple manner, as by screws or slide-ways so that it is easily removed when it is desired to reverse the cutter guard 93.

We wish to further point out a very important feature comprising the design of this tool. It will be noted that the central rotating axis of the motor and shaft 57 is accurately centered with the cutting plane of the cutter blade. This is a very important feature because it produces a perfectly balanced tool eliminating all tendency for the cutter blade to creep or draw to one side as is the case where the cutting line of a hand propelled tool is placed off to one side of the center line of motor armature. With the armature rotating axis center line of our tool lying in the path of the cutting line of cutter blade the tool naturally tends to cut in a straight line when forward motion is present. In other words, the force applied to move the tool forward is directly in line with the center of rotation of the motor and the cutter blade.

In Figs. 14 and 15 we have shown the same machine with slight modifications which is adapted to an adjustable chassis within the casing.

In Fig. 14 the chassis is shown in elevation and indicated at 134. This is the same chassis shown at 34 in Figs. 1 and 9 excepting a few slight alterations in proportions and the elimination of the member 48. In Fig. 14 the cover 149 does not bear directly on the chassis 134 at any point. The base 138 is made deeper than the base 38 and the guard 193 is attached to the guard member 185a. It will be noted that the same pin 39 is used to anchor the rear end of the chassis to the base 138 as is used in the base 38. In Fig. 14, the anchor rod 143 takes the place of rod 43 in Fig. 1 and is threaded lower. The boss 45 is internally threaded to receive the threaded rod 143. The nut 144 is pinned to the rod 143. On the bottom of the rod 143 we have provided a shoulder 150 and a rod pin 151 so that the rod 143 may rotate in the member.

It will thus be noted that the chassis 134 may be pivoted at 39 causing the cutter member 69 to rise or fall, as the case may be, in the base 138, thereby eliminating the necessity of using the second working face in getting different working depths of the cutter member 69.

Fig. 15 shows the rear pivot mounting of the chassis 134 in the base member 138.

In the apparatus shown in Figs. 14 and 15 all adjustment of the cutter is made by means of the adjustment rod 143. The dotted lines in Fig. 14 show the chassis 134 in the lowermost position while the solid lines indicate the same chassis in a raised position.

Having thus described our invention, what we claim as new is:

1. An improved cutting tool comprising a chassis, a rotary cutter and a motor operably connected to said cutter, said cutter and motor being mounted on said chassis and carried thereby, a casing substantially enclosing said chassis, motor and cutter, means movably holding said chassis within said casing, a pin extending through one end of said chassis and supported in the sides of said casing, said chassis being movable on said pin, and means within the casing for angularly adjusting said chassis with respect to said casing and about said pin.

2. An improved cutting tool comprising a chassis, a rotary cutter and a prime mover operably connected to said cutter, said cutter and prime mover being mounted on said chassis and carried thereby, a casing substantially enclosing said chassis and cutter with said cutter having an operative portion adapted to be projected variably from said casing, and means pivotally holding said chassis to an end portion of said casing to thereby permit rotative movement of said chassis.

3. An improved cutting tool comprising a chassis, a rotary cutter and a prime mover operably connected to said cutter, said cutter and prime mover being mounted on said chassis and carried thereby, a casing substantially enclosing said chassis, prime mover and cutter, means pivotally holding said chassis to an end portion of said casing to thereby permit swinging movement of said chassis within said casing, said casing having a recess therein, said chassis having a threaded portion, and an adjusting screw engaging said threaded portion and extending therefrom into said recess and movably confined therein whereby movement of said screw moves said chassis relative to said casing.

4. An improved cutting tool comprising a chassis, a cutter and a motor operably connected to said cutter, said motor and cutter being mounted on said chassis, a casing substantially enclosing said chassis, motor and cutter, said chassis being mounted for movement relative to said casing, said casing having a guide face for presenting work to said cutter, beyond which face said cutter is adapted to project, and adjusting means movably connected to said chassis and connected to said casing and operable at will to change the relative position of said chassis with respect to said casing whereby the position of said cutter relative to said guide face may be varied.

5. An improved cutting tool comprising a chassis, a cutter, and a motor operably connected to said cutter, said motor being mounted to said chassis and carried thereby, a casing substantially enclosing said chassis and cutter, said chassis being movable relative to said casing, said casing having a guide face for said cutter beyond which said cutter is adapted to project, and adjusting means movably connected to said chassis and connected to said casing and operable at will to change the relative position of said chassis with respect to said casing whereby the position of said cutter relative to said guide face may be varied, said means embodying an adjusting member having a portion definitely attached to said chassis and another portion rotatably connected to said casing, said member being movable upon actuation from one definite position to another in said chassis whereby the relative position between said chassis and casing may be changed as desired.

6. An improved cutting tool comprising a chassis, a cutter and a motor operably connected to and supporting said cutter, said motor being mounted to said chassis and carried thereby, a casing substantially enclosing said chassis, and cutter, said chassis being movable within said casing, said casing having a guide face for said cutter beyond which said cutter is adapted to project, and adjusting means movably connected to said chassis and said casing embodying a pin member having a portion intermediate its ends screw-threadedly connected to said chassis, said pin member extending into and rotatable in said casing.

EDWARD M. SALIBA.
MERTON C. VINCENT.